Patented Dec. 26, 1950

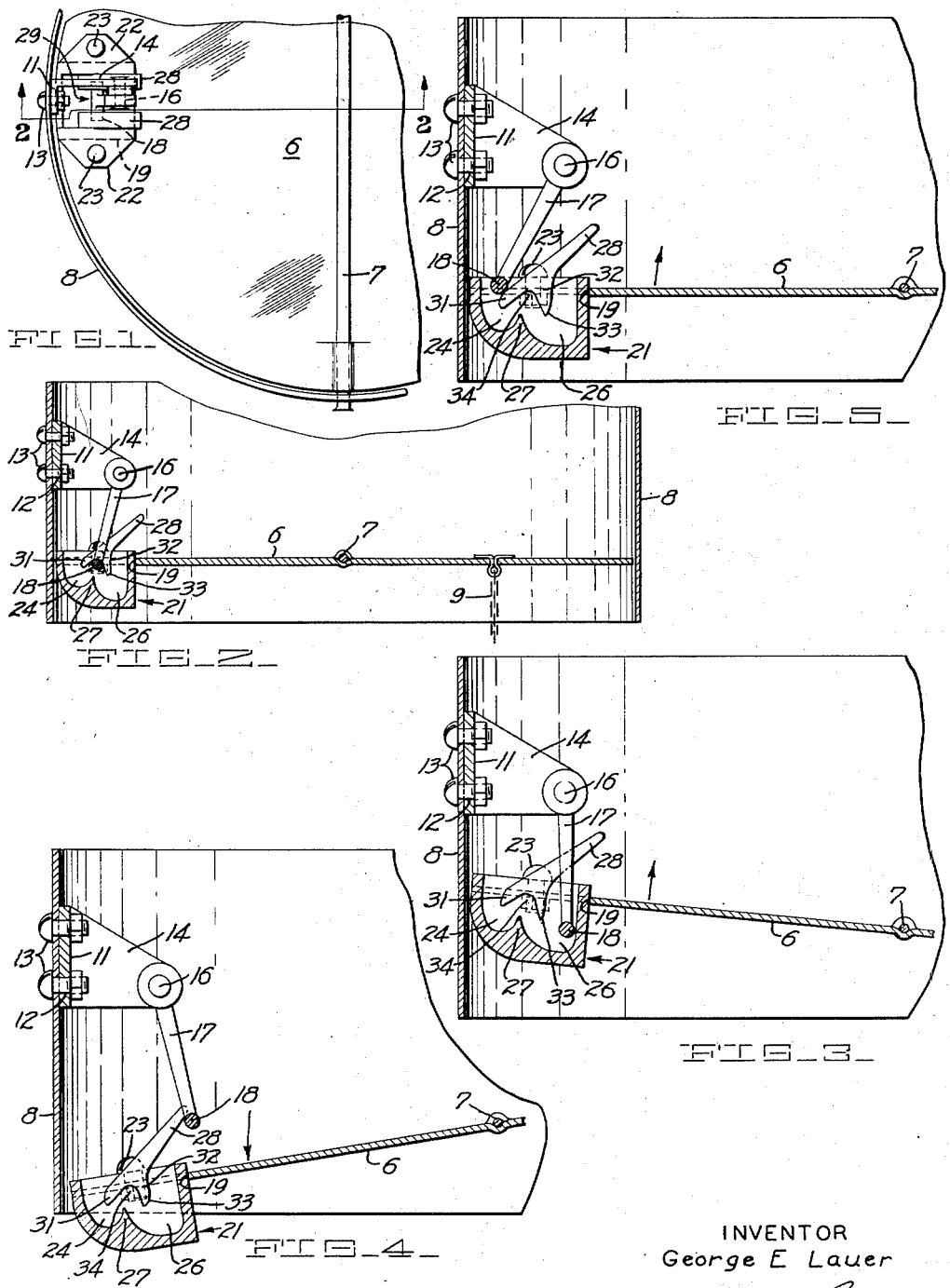

2,535,639

UNITED STATES PATENT OFFICE 2,535,639

DAMPER LATCH

George E. Lauer, Oakland, Calif.

Application July 23, 1946, Serial No. 685,737

4 Claims. (Cl. 126—285)

This invention relates to devices for controlling fluid flow through conduits and has particular reference to latching means functioning to releasably hold a flow control element such as a movable damper in a predetermined position relative to the conduit with which it may be associated.

The structure herein shown and described constitutes an improvement over that disclosed in my prior United States Patent No. 1,785,385 issued December 16, 1930.

An object of the invention is to provide a latch mechanism of the character described which functions under repeated unidirectionally applied actuating forces to alternately latch the flow control element in a predetermined position relative to the conduit or to release the element from said position.

Another object of the invention is to provide a latch of the character described which is unfailing in its operations of securing or releasing the closure element.

A further object of the invention is to provide a latch mechanism of the type referred to comprising component units capable of being operatively mounted on a conduit and its associated closure element with a minimum of construction and assembly operations.

Yet another object of the invention is to provide a latch mechanism, for association with a tubular flue and closure pivotally arranged therein, in which a portion of the mechanism serves the dual function of a latch and a counterweight for expediting movement of the pivoted closure from closed to open positions.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a top plan view of the latch of my invention in association with a conduit and a movable closure for the latter.

Figure 2 is a vertical sectional view taken in the plane indicated by the line 2—2 of Figure 1. The view also illustrates the final positions of the latch parts when the closure is in closed position.

Figure 3 is a portional vertical sectional view, similar to Figure 2, showing the relative positions of the parts in the primary step of the cycle of operations occurring during movement of the closure from closed to opened positions.

Figure 4 is a view similar to Figure 3 illustrating the secondary step occurring in the opening cycle of operations.

Figure 5 is a view similar to Figure 4 illustrating the first step in the cycle of operations occurring during return of the closure from opened to closed positions.

The latch mechanism of my invention is capable of use with a wide variety of closure devices of the type movable about a horizontal pivot axis, but for purposes of this disclosure I have chosen to illustrate and describe one of its more common applications as a control means for a damper 6, or similar flap valve carried on a rocker shaft 7 disposed diametrically of and journaled in the opposite wall members of a tubular conduit 8. The damper 6 when in closed position lies in planar transaxial position relative to the conduit and when in opened position extends in substantially planar parallelism with the axis of the conduit. A pull cord or chain 9, attached to the damper at a point spaced radially thereof from the rocker shaft 7, is provided for effecting movements of the damper between the respective positions thereof.

The latch mechanism of my invention comprises a bracket positioned above the normal position of rest of the damper 6, when the latter is in closed position, comprising a base flange 11 lying contiguously against the inner surface of the conduit 8 and provided with spaced apertures 12 for receiving mounting bolts 13 passing through corresponding and registered apertures provided in the conduit wall. An integral arm 14 formed integrally with the base flange 11 extends radially inwardly therefrom and carries at its inner end a fixed pivot pin 16 upon and from which is journaled and pendantly hangs a link 17 extending downwardly to a position below the plane of the damper, when the latter is in its closed position, and provided at its lower extremity with a pair of cylindrical studs 18 extending from the link and axially paralleling the pivotal axis of the link. The arrangement of the parts is such that the link 17, when free, will hang under the influence of gravity in a longitudinally vertical position and will be free to swing in a plane radially intersecting the longitudinal axis of the conduit.

The damper 6, at a point on its periphery directly below the link 17 and its mounting bracket, is provided with a notch 19 in which is positioned a combined latch block and counterweight, generally indicated by the numeral 21 which has flanges 22 extending therefrom and overlying the parallel radially extending sides of the notch 19. Bolts 23, extending through apertures formed in the flanges and damper, are provided for securing the latch block to the damper. The latch block, which is preferably a cast metal element, possesses sufficient weight as to impose an appreciable overbalancing force on the damper so as to constantly urge the latter to assume a planar vertical relationship with and paralleling the axis of the conduit, in which position the damper will be fully open.

In Figures 2 to 5 inclusive it will be seen that the latch block is provided with an upwardly opening recess cross-sectionally shaped to form a pair of pockets 24 and 26 separated by an upwardly extending ridge 27 having a height which is only a fractional portion of the total depth of the recess. The ridge 27, pockets 24 and 26 and the studs 18 are all disposed in relative parallel relationship. Formed integrally with the latch block and extending inwardly from the sides of the recess traversing the pockets 24 and 26 is a pair of relatively spaced fingers 28 positioned below the link 17 and extending angularly upwardly out of the recess toward the center of the damper. The slot 29 or space between the fingers 28 is sufficiently wider than the link so that the latter may swing freely through the slot but the studs 18 projecting from the link have a combined length wider than the slot and consequently engage the horizontal surfaces of the fingers bordering the slot during movements of the latch elements relatively toward and from each other. The lower end 31 of each finger 28 within the latch block recess is positioned above the pocket 24 so that said end is spaced upwardly and outwardly from the top of the ridge 27 in a direction extending radially of the damper. Formed integrally with each finger 28 and extending substantially vertically downwardly from the bottom surface of the former is a spur 32 overlying the pocket 26 and having its lower end 33 spaced slightly above and inwardly from the top of the ridge 27 in a direction extending radially of the damper. The relatively divergent lower end of the finger 28 and the spur 32 define therebetween a downwardly opening notch 34 positioned substantially vertically above the top of the ridge 27.

The arrangement of the parts is such that as the damper is moved about its pivotal axis between opened and closed positions, the latch block will be caused to travel in an invariable arcuate path from and toward the studs 18 when the link 17 is pendently hanging and at rest relative to its mounting bracket. In addition, the relative positions of the parts are such that, upon relative approach, the studs 18 will first engage the upper surfaces of the fingers 28 at points intermediate the upper and lower ends of the latter. As illustrated in Figure 2, the damper is in fully closed position with the studs 18 resting in the notch 34 of the latch block and preventing the overbalancing weight of the latter from swinging the damper to its opened position. When the parts are in this position it will be noted that the link 17 is vertically inclined so that its center of gravity and the studs 18 lie radially outwardly with respect to its pivotal center. When it is desired to open the damper, a downward pull is exerted on the pull cord or chain 9. This causes the latch block to be raised and permits the studs 18 to escape from the notch 34 under the elevated lower end 33 of the spur 32 so that the link may swing under the influence of gravity to a vertical position overlying the pocket 26 and with the studs 18 within the latter pocket. Such positions of the parts are shown in Figure 3. Upon release of the downward pull exerted on the pull cord 9, the weight of the latch block will cause the damper to wing about its rotational axis until the latch block descends to the lowest position in its arc of travel wherein the damper will be substantially in planar parallelism with the axis of the conduit. At the start of the downward movement of the latch block, the link will be swung radially inwardly of the conduit due to the studs riding along the upwardly sloping bottom surfaces of the fingers, as shown in Figure 4, until the studs clear the upper ends of the fingers whereupon the link may swing to and rest in a longitudinally vertical position.

The succeeding downward pull exerted on the pull cord 9 will cause the latch block to approach the pendant link so that the upper inclined surfaces of the fingers will engage the studs and will effect, as shown in Figure 5, a radially outward swinging of the link until the studs pass into the pocket 24 below the lower ends 31 of the fingers to impinge against the outward side of the ridge 27. Release of the downward pull on the pull cord will then cause the latch block to descend relative to the link so that the studs will be received and retained in the notches 34 as shown in Figure 2. The damper has thus been returned to closed position. The coaction of the studs 18 and the latch block when the former are moving through the passages of the latter is very important and constitutes one of the principal features of my invention serving to render the operation of the latch mechanism positive and unfailing regardless of how forcibly the pull cord may be yanked in opening and closing the damper. It may be seen in Figure 5 that in the first stage of the damper closing operation as described above when the studs 18 pass downwardly over the lower ends 31 of the fingers, the studs will swing inwardly to engage the outward side of the ridge 27 below the upper end of the latter. If a continued downward pull is exerted on the pull cord the latch block will rise until the studs reach the bottom of the pocket 24 whereupon further upward movement of the latch block is prevented thus serving as a stop for the upward closure movement of the damper. Upon release of the pull cord the latch block will move downwardly thus causing the studs 18 to ride upwardly along the outer side of the ridge 27 and to ride over the upper end of the latter to fall inwardly of the conduit and to engage the outer surfaces of the spurs 32 whereupon the studs will move along the latter surface into the notch 34. During the succeeding downward pull on the pull cord, the studs will ride downwardly along the outer surfaces of the spurs and will pass under the lower end thereof into the pocket 26 so that the damper is fully released as explained previously. It will be noted that the top of the ridge 27 and the lower end 33 of the spur 32 are relatively positioned so that one or the other, during the first cycle of movement of the latch block in bringing the damper to closed position, will lie across the arcuate path followed by the studs with the result that it is impossible during said first cycle of movement for the studs to pass directly into the pocket 26 immediately after entering the pocket 24. Thus the latch will unfailingly operate each time that the pull cord is drawn downwardly and the annoyance of having to make two or more tries before the damper can be securely closed is obviated.

I claim:

1. In a member having a passage therein, a valve supported for pivotal movement within said passage in such a manner that an edge thereof is adapted to move downwardly under the influence of gravity to open said valve and to move upwardly against gravity to close said valve, a latch structure comprising means operatively associated respectively with the member and the valve adjacent its said edge and cooperative to hold said valve in closed position, said latch structure comprising a first latch element supported for pivotal movement on said member within the passage thereof above said edge and a second latch element carried by the valve adjacent its said edge and movable therewith from and toward said first latch element, said second latch element comprising a pair of pockets having a guide element therebetween, said first latch element having a portion thereof movable into one of said pockets during the closing movement of said valve, means for guiding said first latch element into the one pocket, receiving means for said portion carried by said second latch element adjacent and above said guide element, said guide element engaging said portion immediately upon entry thereof into the one pocket for guiding said portion toward said receiving means and precluding movement of said portion into the other pocket, said receiving means engaging said portion upon movement of the latter from said guide element whereby said valve is secured in closed position, said portion being adapted to move by gravity into said second pocket upon its release from said receiving means by further upward movement of said edge.

2. In a member having a passage therein, a valve supported for pivotal movement within said passage in such a manner that an edge thereof is adapted to move downwardly under the influence of gravity to open said valve and to move upwardly against gravity to close said valve, a latch structure comprising means operatively associated respectively with the member and the valve adjacent its said edge and cooperative to hold said valve in closed position, said latch structure comprising a first latch e'ement supported for pivotal movement on said member within the passage thereof above said edge and a second latch element carried by the valve adjacent its said adge and movable therewith from and toward said first latch element, said second latch element comprising a pair of pockets having a guide element therebetween, said first latch element having a portion thereof movable into one of said pockets during the closing movement of said valve, said one pocket having a bottom surface which cooperates with said portion when the latter enters said one pocket to act as a stop for the upward closure movement of said edge, means for guiding said first latch element into the one pocket, receiving means for said portion carried by said second latch element adjacent and above said guide element, said guide element engaging said portion immediately upon entry thereof into the one pocket for guiding said portion toward said receiving means and precluding movement of said portion into the other pocket, said receiving means engaging said portion upon movement of the latter from said guide element whereby said valve is secured in closed position, said portion being adapted to move by gravity into said second pocket upon its release from said receiving means by further upward movement of said edge.

3. In a member having a passage therein, a valve supported for pivotal movement within said passage in such a manner that an edge thereof is adapted to move downwardly under the influence of gravity to open said valve and to move upwardly against gravity to close said valve, a latch structure comprising means operatively associated respectively with the member and the valve adjacent its said edge and cooperative to hold said valve in closed position, said latch structure comprising a first latch element supported for pivotal movement on said member within the passage thereof above said edge and a second latch element carried by the valve adjacent its said edge and movable therewith from and toward said first latch element, said second latch element comprising a pair of upwardly opening recesses defining pockets having a guide element therebetween, said first latch element having a portion thereof movable into one of said pockets during the closing movement of said valve, said one pocket having a bottom surface which cooperates with said portion when the latter enters said one pocket to act as a stop for the upward closure movement of said edge, means for guiding said first latch element into the one pocket, receiving means for said portion carried by said second latch element adjacent and above said guide element, said receiving means including a downwardly opening notch adjacent and above said guide element, said guide element engaging said portion immediately upon entry thereof into the one pocket for guiding said portion toward said receiving means and precluding movement of said portion into the other pocket, said receiving means engaging said portion upon movement of the latter from said guide element for guiding said portion into said notch whereby said valve is secured in closed position, said portion being adapted to move by gravity into said second pocket upon its release from said notch by further upward movement of said edge.

4. In a member having a passage therein, a valve supported for pivotal movement within said passage in such a manner that an edge thereof is adapted to move downwardly under the influence of gravity to open said valve and to move upwardly against gravity to close said valve, a latch structure comprising means operatively associated respectively with the member and the valve adjacent its said edge and cooperative to hold said valve in closed position, said latch structure comprising a pendant link supported for pivotal movement on said member within the passage thereof adjacent and above said edge and a latch block carried by said valve adjacent its said edge and movable therewith from and toward said link, said block having therein a pair of upwardly opening recesses defining pockets having a separating ridge therebetween, said pendant link having a stud thereon registerable with and movable into one of said pockets during the closing movement of said valve, a finger carried by said block and engageable with said stud during the closing movement of said valve for guiding said stud into the one pocket, a spur element carried by said finger and extending therefrom to a position adjacent and above said ridge, said spur element in conjunction with said finger defining a downwardly opening notch adjacent and above said ridge, said ridge engaging said stud immediately upon entry thereof into the one pocket for guiding said stud toward said spur element and precluding movement of the stud into the other pocket, said spur element engaging said stud upon movement of the latter from said ridge for guiding said stud into said notch whereby said valve is secured in closed position, said stud being adapted to move by gravity into said second pocket upon its release from said notch by further upward movement of said edge.

GEORGE E. LAUER.

REFERENCES CITED

The following references are of record in the file of this patent:

UNITED STATES PATENTS

| Number | Name | Date |
| --- | --- | --- |
| 1,183,464 | Johnson | May 16, 1916 |
| 1,509,780 | Robertson | Sept. 23, 1924 |
| 1,785,385 | Lauer | Dec. 16, 1930 |